US010916927B2

(12) United States Patent
Smolik

(10) Patent No.: US 10,916,927 B2
(45) Date of Patent: Feb. 9, 2021

(54) BRIDGE POWER MODULE WITH HIGH-JOULE IN-WALL SURGE PROTECTION

(71) Applicant: J&C Group, Inc., Mentor, OH (US)

(72) Inventor: James Smolik, Cleveland, OH (US)

(73) Assignee: J&C Group, Inc., Mentor, OH (US)

( * ) Notice: Subject to any disclaimer, the term of this patent is extended or adjusted under 35 U.S.C. 154(b) by 186 days.

(21) Appl. No.: 16/361,577

(22) Filed: Mar. 22, 2019

(65) Prior Publication Data
US 2020/0303912 A1    Sep. 24, 2020

(51) Int. Cl.
*H02G 3/12* (2006.01)
*H02G 3/08* (2006.01)
*H01C 7/12* (2006.01)
*H01R 25/00* (2006.01)
*H02G 3/16* (2006.01)
*H02H 5/04* (2006.01)
*H02H 9/04* (2006.01)
*H02G 3/14* (2006.01)

(52) U.S. Cl.
CPC ............ *H02G 3/088* (2013.01); *H01C 7/12* (2013.01); *H01R 25/006* (2013.01); *H02G 3/083* (2013.01); *H02G 3/12* (2013.01); *H02G 3/14* (2013.01); *H02G 3/16* (2013.01); *H02H 5/047* (2013.01); *H02H 9/045* (2013.01); *H02H 9/04* (2013.01)

(58) Field of Classification Search
USPC .................................................. 361/117–119
See application file for complete search history.

(56) References Cited

U.S. PATENT DOCUMENTS

| | | | |
|---|---|---|---|
| 2,221,005 | A | 11/1940 | Reese |
| 2,612,947 | A | 10/1952 | Jenks |
| 5,228,238 | A | 7/1993 | Fenkell |
| 5,487,244 | A | 1/1996 | Hill |
| 5,768,833 | A | 6/1998 | Golen |
| 6,269,597 | B1 | 8/2001 | Haas |
| 6,363,664 | B1 | 4/2002 | Brutsaert |
| 7,584,579 | B1 | 9/2009 | Everitt |
| 7,805,897 | B2 | 10/2010 | Holland et al. |
| 8,966,839 | B2 | 3/2015 | Rebman et al. |
| 8,975,518 | B1* | 3/2015 | Gretz ...................... H02G 1/00 174/53 |
| 9,353,529 | B2 | 5/2016 | Richmeier |
| 2005/0185357 | A1* | 8/2005 | Hoopes .............. H01R 13/6666 361/119 |
| 2009/0038244 | A1 | 2/2009 | Kuhn et al. |
| 2009/0266013 | A1 | 10/2009 | Motosko et al. |
| 2009/0313920 | A1 | 12/2009 | Jaure |

(Continued)

*Primary Examiner* — Danny Nguyen
(74) *Attorney, Agent, or Firm* — Dominic A. Frisina

(57) ABSTRACT

A power bridge is provided, allowing a user to hide power cables behind a preexisting wall while providing onboard surge protection. One module of the bridge may include an electrical box having an electrical outlet. A medial compartment may be provided which may contain a surge protection circuit in electrical communication with the plurality of outlet terminals. The module may be configured to receive power from a second module located lower on the same wall. The second module may receive power from a preexisting outlet hardwired to an electrical mains by running a conventional extension cord from the outlet to the second module.

17 Claims, 7 Drawing Sheets

(56) References Cited

U.S. PATENT DOCUMENTS

| | | |
|---|---|---|
| 2013/0186008 A1 | 7/2013 | Gower |
| 2013/0239497 A1 | 9/2013 | Burleson |
| 2014/0041324 A1 | 2/2014 | Massey |
| 2014/0144090 A1 | 5/2014 | Rebman et al. |
| 2016/0258208 A1 | 9/2016 | Soha |

* cited by examiner

BRIDGE POWER MODULE WITH HIGH-JOULE IN-WALL SURGE PROTECTION

I. BACKGROUND OF THE INVENTION

A. Field of Invention

The invention generally relates to power bridges and power bridge kits.

B. Description of the Related Art

It is known to use power bridges for hiding power cables behind wallboard. For instance, a typical application involves mounting a flat screen television to a wall. Televisions are generally mounted much higher on the wall than electrical outlets, which are typically less than two feet from the base of the wall. Without a power bridge, the television's power cable would be visible as it hangs down from the television to an electrical receptacle. In contrast, a power bridge allows the power cable to run behind the wallboard, either to an outlet hardwired to an electrical mains or to a second power bridge module mounted low on the wall. In the case of bridges having a second module, the second module typically has a male receptacle that is powered with an extension cord running from a hardwired outlet. Since power bridges are not usually hardwired to an electrical mains, power bridge kits can be installed without an electrician.

Surge protectors are also known in the art. A well-known type of surge protector is a power strip having a plurality of female receptacles with a male electrical plug that receives mains power from an electrical outlet. In such devices, the receptacles include a metal oxide varistor (MOV) that bridges the positive wire of the receptacle to a ground wire. In the absence of a power surge, the MOV does not conduct electricity; however, when voltage rises above a predetermined threshold the MOV becomes conductive and shunts excess power to ground.

Similarly, electrical outlets incorporating surge protection circuitry are also known in the art. Known devices have metal oxide varistors wired similar to that of a power strip. While MOVs are very effective at protecting electrical devices from power surges, they can fail in a manner that produces enough excess heat to cause a fire. Despite this shortcoming, existing outlets lack structures that shield the MOVs from surrounding flammable matter. Furthermore, existing MOV-equipped outlets are very limited in the amount of surge protection because individual MOVs are limited in the amount of energy that they can shunt to ground. Providing more surge protection requires commensurately more MOVs; however, known outlets lack sufficient space to accommodate additional MOVs. Thus, known outlets are only capable of providing a small degree of in-wall surge protection.

Outlets with built-in surge protection circuitry are distinct from ground fault circuit interrupters (GFCI) which respond to current imbalances rather than voltage spikes. For instance, a common GFCI circuit compares the current carried by the positive wire to the current carried by the negative, or neutral, wire. Any drop in current between the positive and neutral lines is presumed to be a fault, and if a predetermined current-drop threshold is exceeded the circuit trips a built-in breaker.

What is missing in the art is a power bridge with high-joule built-in surge protection that shields surrounding flammable matter from fire produced by an MOV failure. Some embodiments of the present invention may provide one or more benefits or advantages over the prior art.

II. SUMMARY OF THE INVENTION

Some embodiments may relate to a power module of a power bridge, such as may be used with wall mounted flat panel televisions. The power module may include an electrical box having a first gang and a second gang. An electrical outlet may be disposed in the first gang. At least one low voltage wire port may be disposed in the second gang, and may be communicable with an interior of a hollow wall. The module may further include a medial compartment bounded by a medial wall and a medial enclosure, wherein the medial compartment is divided from the first and/or second gang by the medial wall. A plurality of outlet terminals of the electrical outlet may be communicably accessible from within the medial compartment. A surge protection circuit may be housed within the medial compartment, and may be in electrical communication with the plurality of outlet terminals. The module may further include a plurality of medial terminals extending through the medial enclosure. The medial terminals may be communicably accessible from a side of the medial enclosure opposing the medial compartment. Moreover, the plurality of medial terminals may be in electrical communication with the plurality of outlet terminals through the surge protection circuit.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof, wherein like reference numerals indicate like structure, and wherein.

IV. DETAILED DESCRIPTION OF THE INVENTION

As used herein the terms "embodiment", "embodiments", "some embodiments", "other embodiments" and so on are not exclusive of one another. Except where there is an explicit statement to the contrary, all descriptions of the features and elements of the various embodiments disclosed herein may be combined in all operable combinations thereof.

Language used herein to describe process steps may include words such as "then" which suggest an order of operations; however, one skilled in the art will appreciate that the use of such terms is often a matter of convenience and does not necessarily limit the process being described to a particular order of steps.

Conjunctions and combinations of conjunctions (e.g. "and/or") are used herein when reciting elements and characteristics of embodiments; however, unless specifically stated to the contrary or required by context, "and", "or" and "and/or" are interchangeable and do not necessarily require every element of a list or only one element of a list to the exclusion of others.

Terms of degree, terms of approximation, and/or subjective terms may be used herein to describe certain features or elements of the invention. In each case sufficient disclosure is provided to inform the person having ordinary skill in the art in accordance with the written description requirement and the definiteness requirement of 35 U.S.C. 112.

Figure 1:
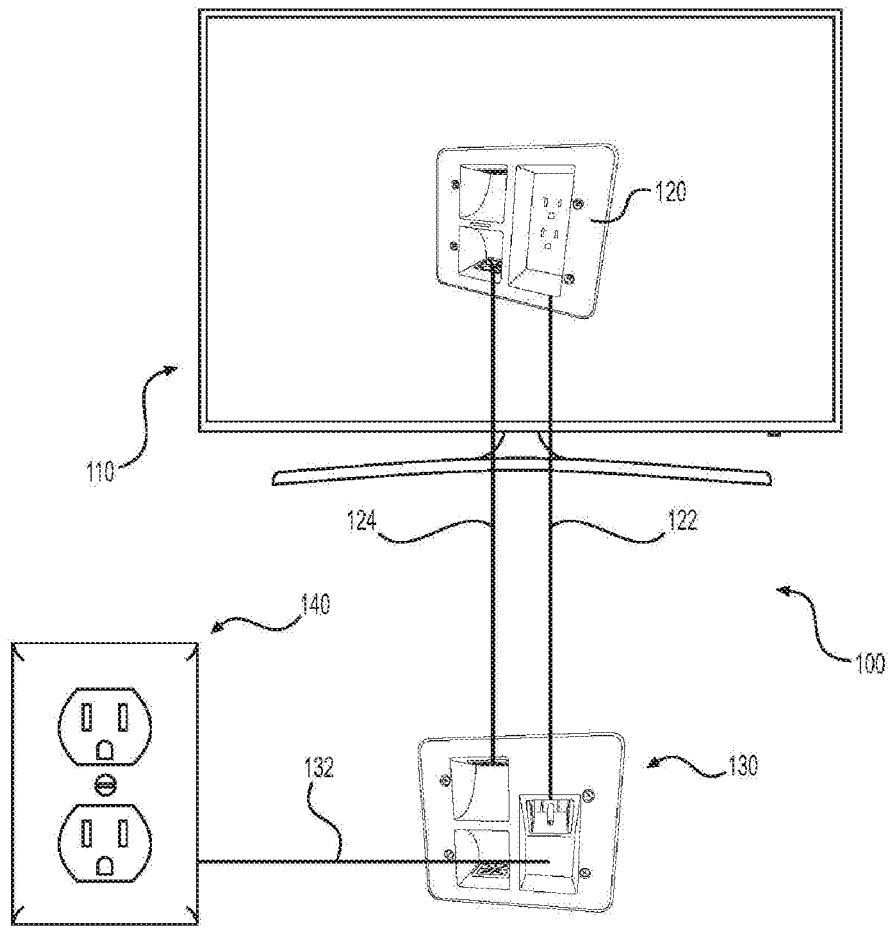
FIG. 1 is a schematic drawing of a typical installation of an embodiment.

Referring now to the drawings wherein the showings are for purposes of illustrating embodiments of the invention only and not for purposes of limiting the same, FIG. 1 is a schematic illustration of a typical installation 100 of an embodiment. The installation 100 includes a wall-mounted flat panel television 110. A first module 120 is installed behind the television 110. While a flush-mounted embodiment is illustrated, a surface-mounted embodiment could be substituted without departing from the scope of the invention. A second module 130 is shown mounted low on the wall, below the television 110 and first module 120. The second module 130 is roughly level with an outlet 140 hardwired to an electrical mains.

The first 120 and second 130 modules are in electrical communication with each other through a building wire 122, which can be a standard 14 gauge two-conductor nonmetallic jacketed cable such as is provided commercially under the Romex® brand. The skilled artisan will readily appreciate that the invention is not limited by choice of building wire, as any of a wide variety of such cabling can be appropriate depending on the building codes and electrical service standards of a given jurisdiction. For example, in the United States 110V, 15 Amp service is typical for most household appliances, and building codes generally require the service to be supplied by 14 gauge two-conductor cabling made according to certain well-known standards. However, other nations have different electrical service standards, and would require an embodiment to be constructed and wired accordingly. All such differences are readily understood to the skilled artisan and are therefore well within the scope of the present invention.

With continuing reference to FIG. 1, the first module 120 routes both power 122 and low-voltage 124 cables behind a wall (not shown), to the second module 130. The low voltage wires 124 exit the wall through the second module 130 and run to another device, e.g. a DVD player or stereo (not shown). The power cable 122 communicates with a male plug of the second module 130, which is capable of receiving a female plug of a common extension cord 132. Therefore, the power bridge, i.e. modules 120 and 130, can be powered by a hardwired electrical outlet 140.

Figure 2:
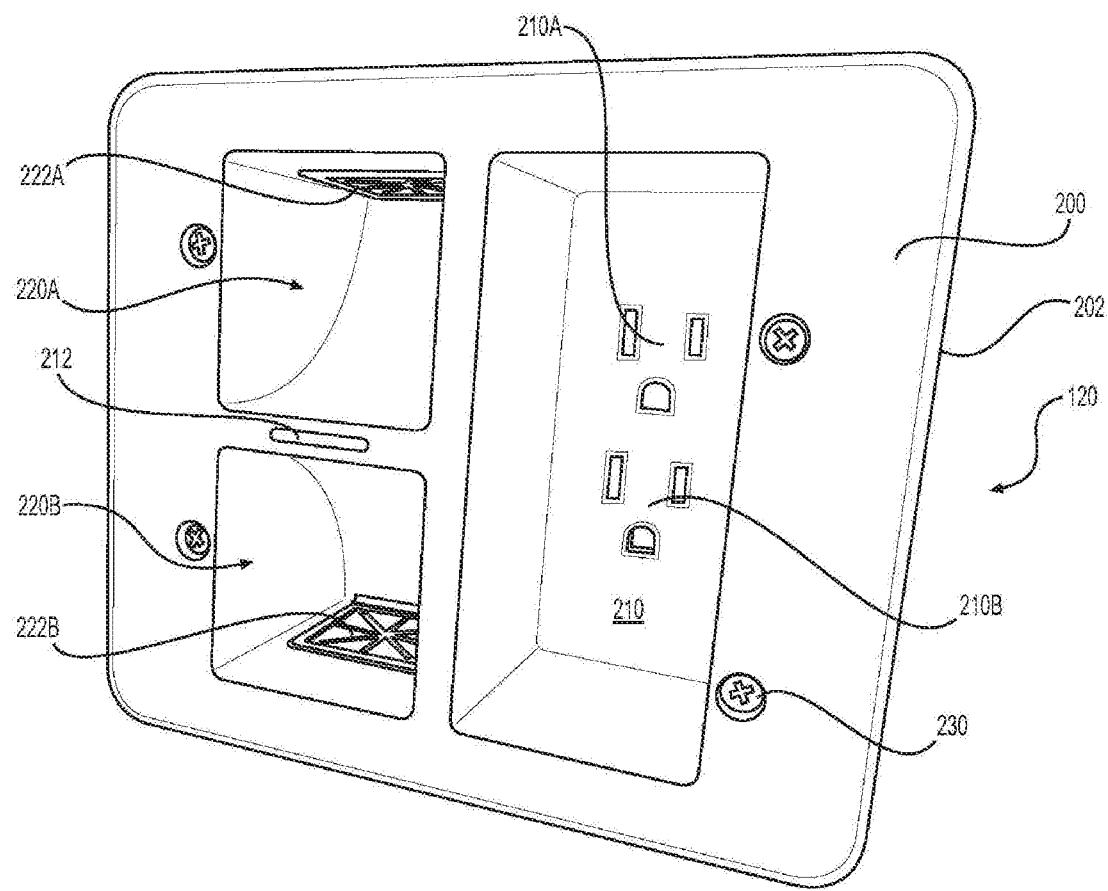
FIG. 2 is a front perspective view of an embodiment.

Turning to FIG. 2, the first power bridge module 120 is shown in more detail. A generally flat outer surface is shown which comprises a flange 200. The flange 200 defines an outer perimeter 202 of the module 120 and serves as a mounting means for flush-mounting the module 120 to a wall. A plurality of screws 230 are provided for this purpose as well, as will be described in more detail later.

The module 120 comprises a two-gang form factor. As used herein the term gang is used to indicate the position of groups of components. For instance, a recessed outlet 210 is disposed in a first gang, and structures for receiving low voltage wires are disposed in a second gang. The skilled artisan will readily appreciate that the outlet 210 need not be recessed, and that embodiments lacking a recess are within the scope of the invention. The outlet 210 includes a first female receptacle 210A and a second female receptacle 210B. The power cable of an appliance such as a wall-mounted television would plug into either of the female receptacles 210A, 210B.

With continuing reference to FIG. 2, an upper low voltage wire port 222A and a lower low voltage wire port 222B are shown in the second gang of the module 120. The ports 222A, 222B are communicable with an interior of a hollow wall. For instance, a typical 2×4 framed wall covered with sheet rock has a hollow space between the studs of the frame. The low voltage wire ports 222A, 222B provide a path for wires to be inserted into the hollow space between the studs and fed to the second module (not shown). The pair of low voltage wire ports 222A, 222B are recessed and define wire scoops 220A, 220B. The scoops 220A, 220B assist the user in feeding low voltage wires through the ports 222A, 222B. An indicator LED 212 is disposed in the space between the recesses. The LED 212 provides visual verification that the surge protection components of the module 120 are operational.

Figure 3:
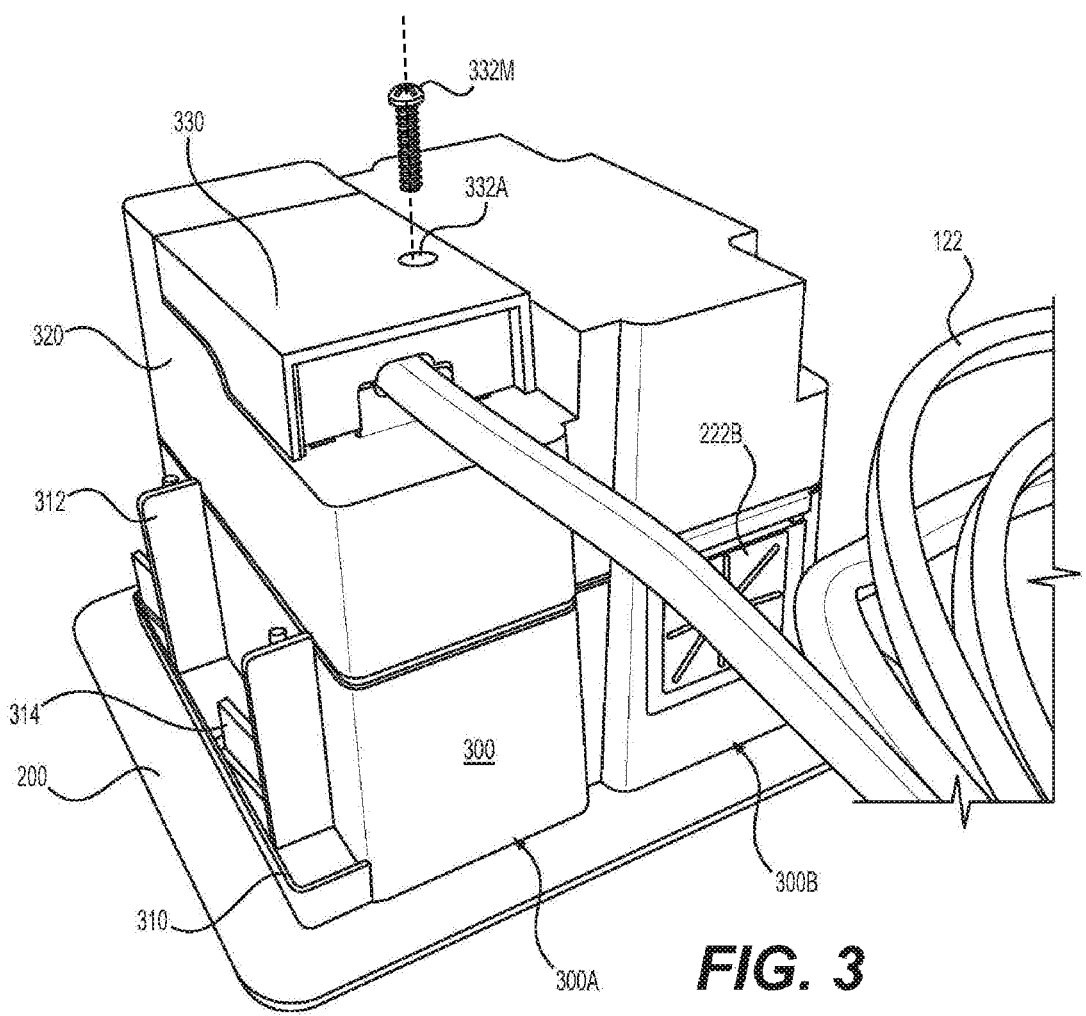
FIG. 3 is a drawing of an embodiment from a bottom rear perspective.

FIG. 3 shows the first bridge module 120 from a rear perspective. The flange 200 is more clearly visible. Also shown is an electrical box 300 defining the first and second gangs 300A, 300B. The outlet (not shown) is contained within the first gang 300A, and the low voltage wire ports 222A, 222B are disposed in the second gang 300B. The electrical box 300 includes guide rails 312 and a register boss 310 to fixedly locate the module 120 within a template-cut hole made in the wall for mounting the module 120. The register boss 310 also serves to hold mounting fins 314 in a stowed position until they are ready to be deployed behind wallboard.

With further reference to FIG. 3, a medial enclosure 320 is shown fitted to the rear of the electrical box 300. The medial enclosure may be removably attachable according to any known means of attachment. For instance, and without limitation, the medial enclosure 320 may be screw-mounted to the electrical box 300 using female-threaded mounting posts 415F (see FIGS. 4 and 6) mateable with mounting screws 415M (see FIG. 6) through apertures 415A (see FIG. 6) in the medial enclosure 320. The person having ordinary skill in the art will readily appreciate that any number of alternative means are also appropriate and well within the scope of the invention. For instance, the ordinarily skilled artisan would readily understand how to mate the medial enclosure 320 with the electrical box 300 in a snap fit, or with releasable latches and clasps, and so on.

With continuing reference to FIG. 3, a terminal cover 330 is shown installed on the medial enclosure 320, covering electrical terminals (not shown). The space enclosed by the terminal cover 330 and medial enclosure 320 is referred to herein as the terminal compartment, which is visible in FIG. 6. As will be described in greater detail elsewhere, the terminals fixedly receive, and make electrical contact with, a building wire 122. The terminal cover 330 is attachable to the medial enclosure 320 according to any known means, similar to the attachment of the medial enclosure 320 to the electrical box 300. However, the illustrated embodiment includes structures for screw-mounting the terminal cover 330 to the medial enclosure 320. Particularly, an aperture 332A receives a screw 332M which mates with a female-threaded mounting post 332F (see FIG. 6). Again, this is merely an illustrative example, rather than limiting the invention. The ordinarily skilled artisan will readily appreciate a wide variety of attachment means, all of which are within the scope of the claimed invention.

Figure 4:
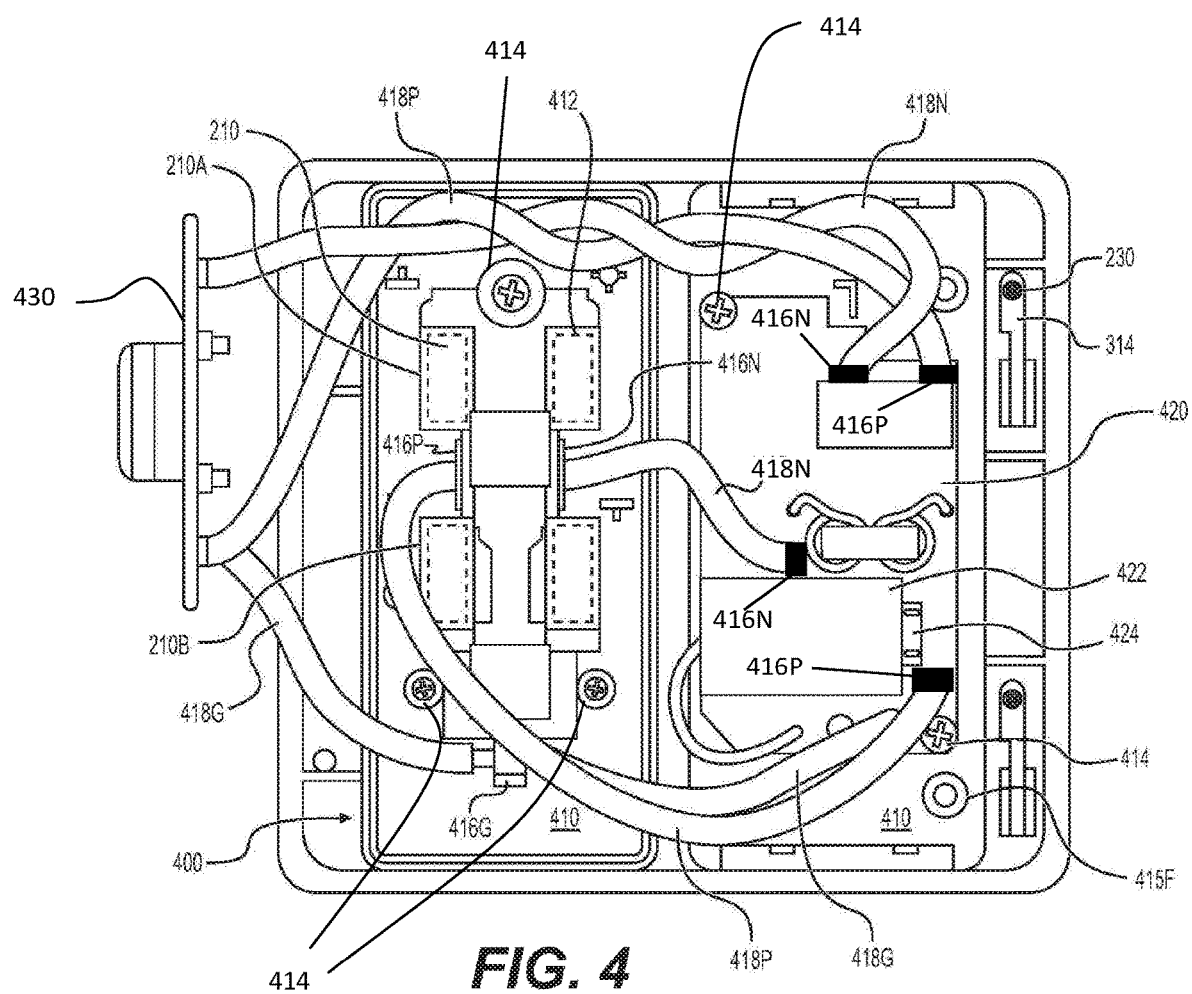
FIG. 4 is a rear view of the medial compartment of an embodiment.

Turning to FIG. 4, the medial compartment 400 is shown in detail. The medial compartment 400 is the space containing all structures bounded by the inside surface of the medial enclosure 320 and the medial wall 410. With particular reference to the medial wall 410, as shown in the embodiment illustrated in FIG. 4, the medial wall 410 need not be a single continuous or even flat wall. The medial wall 410 serves to divide the medial compartment 400 from the first and second gang 300A, 300B. The outlet 210 extends through the medial wall 410, and thus is simultaneously in the first gang 300A and the medial compartment. However, the ordinarily skilled artisan will readily appreciate that the position of the outlet in both the first gang and the medial compartment is not a limitation of the invention, but rather is a single embodiment thereof.

With continuing reference to FIG. 4, the medial wall 410 includes an outlet boss 412, and mounting posts 414 female-threaded to receive mounting screws. The outlet boss 412 is shown receiving the outlet 210, particularly the receptacles thereof 210A, 210B. The outlet 210 is screw-mounted to the mounting posts 414 to fix its position within the module 120. Thus, the outlet 210 is mounted to the medial wall 410. A positive outlet terminal 416P of the outlet 210 is shown within the medial compartment 400 in electrical communication with a positive outlet wire 418P. The outlet terminal 416P is thus communicably accessible from within the medial compartment 400, meaning it is accessible for electrical communication with, for instance, wires and other electrical components within the medial compartment 400. Neutral outlet wire 418N, and ground outlet 418G wire are shown similarly connecting to neutral 416N and ground 416G outlet terminals of the electrical outlet 210.

Figure 5:
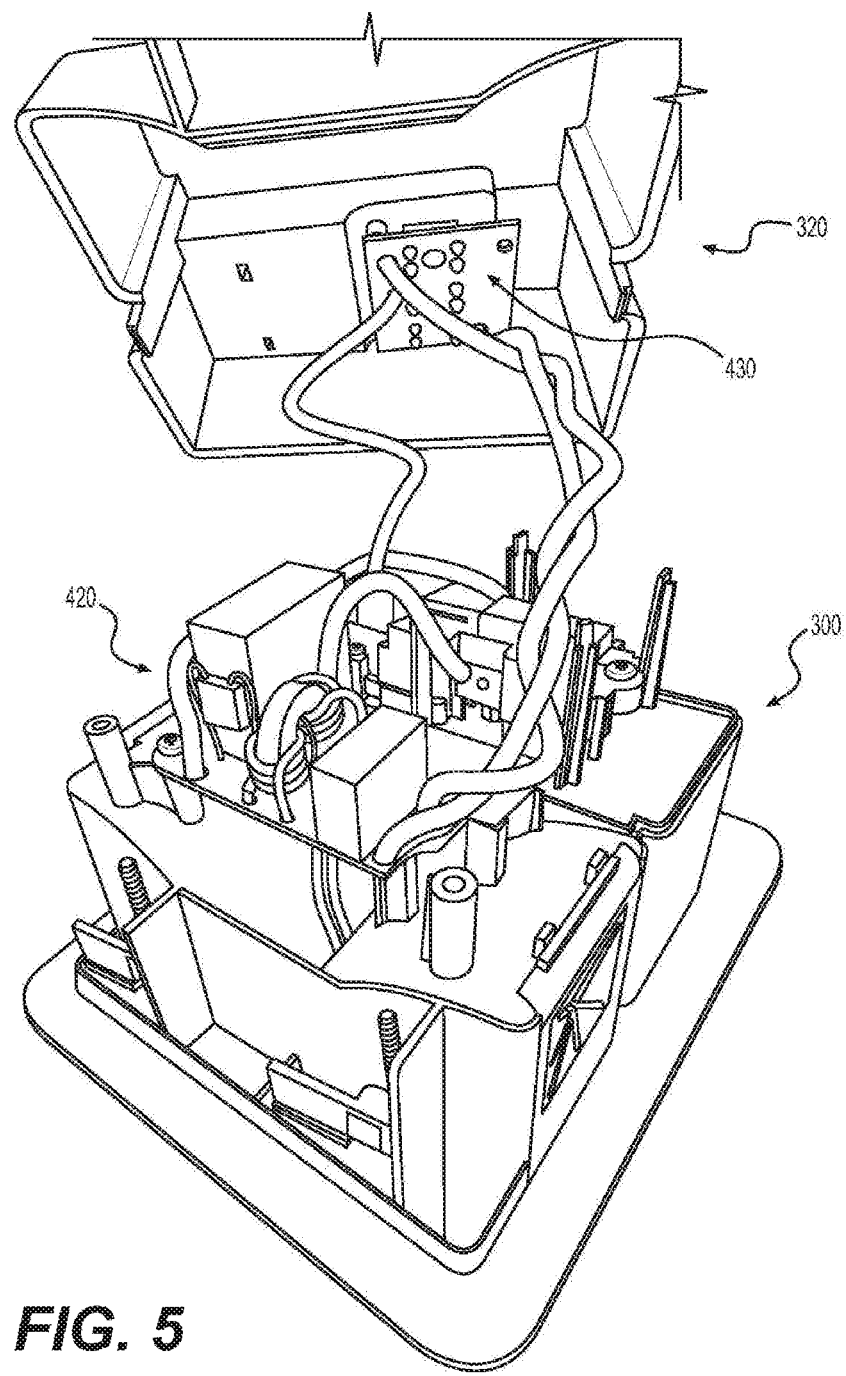
FIG. 5 is a view of the medial compartment and medial enclosure of an embodiment.

With combined reference to FIGS. 4 and 5, a circuit board 420 is shown similarly screw-mounted to posts 414 of the second gang. Thus, the circuit board 420 is mounted to the medial wall 410. The positive and neutral wires 418P, 418N electrically connect positive 416P and neutral 416N terminals of the outlet 210 to corresponding output terminals 416P, 416N of the surge protection circuit 420, which in this embodiment are solder joints. These output terminals 416P, 416N supply the outlet 210 with power from the surge protection circuit board 420. The positive and neutral input terminals 416P, 416N of the surge protection circuit board 420 receive power from the positive and neutral terminals 416P, 416N of the medial terminal strip board 430 (FIG. 5) through positive and neutral wires 418P, 418N. Ground wires 418G connect the ground terminals 416G of the outlet 210 and the circuit board 420 respectively to a ground terminal of the medial terminal strip board 430 (FIG. 5).

With further regard to FIG. 4, the circuit board 420 includes surge protection circuitry comprising one or more metal oxide varistors providing transient electrical communication between the positive wire 418P and the ground wire 418G, as is known in the art for surge protection circuitry. The metal oxide varistors are contained within a fireproof ceramic housing 422 and are in electrical and thermal communication with a thermally sensitive circuit breaker 424, which opens the circuit when a predetermined threshold temperature of the housing 422 is reached. Accordingly, in the event of overheating, the ceramic housing 422 and the thermal breaker 424 serve to prevent the module 120 from catching fire.

Figure 6:
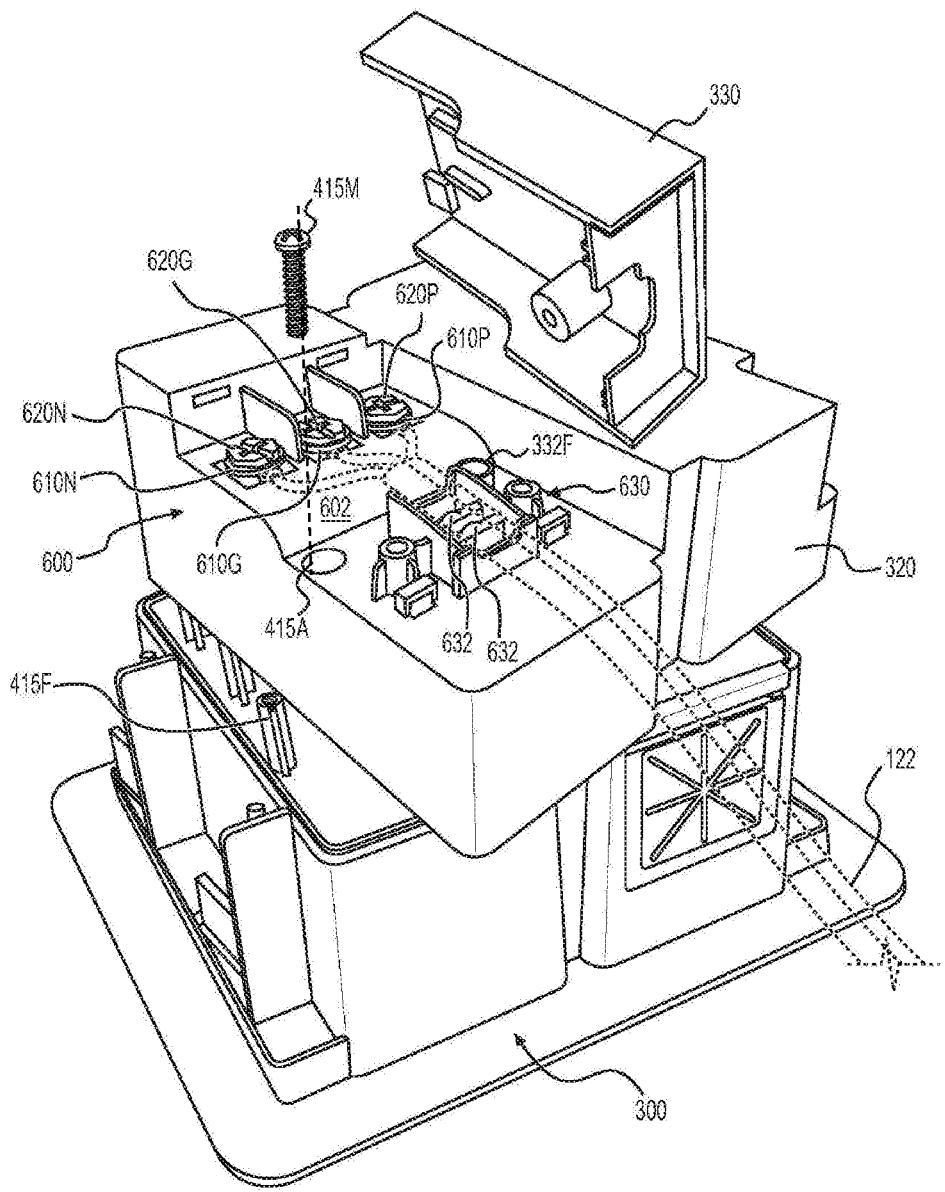
FIG. 6 is a view of an embodiment with the terminal cover removed.

Turning to FIG. 6, the medial enclosure 320 is shown from a side opposing the medial compartment 400. The terminal cover 330 is removed, revealing a terminal strip 600 and other structures in the terminal compartment 602. The terminal strip 600 includes a neutral terminal 610N and neutral terminal screw 620N, a ground terminal 610G and ground terminal screw 620G, and a positive terminal 610P and positive terminal screw 620P. A building wire 122 is installable on the terminal strip 600 according to known means, namely by wrapping bare sections of the conductor and ground of wires around corresponding terminal screws and tightening the screws. The building wire may be a standard 14 gauge two-conductor cable, as is commercially available under the brand name Romex®; however, the invention is not limited to a particular building wire gauge or type, and the person having ordinary skill in the art will readily appreciate how to modify the invention to cooperate with building wires satisfying other standards. The building wire is held in place by routing it through the cable clamp 630 and compressing it against the jaws 632 thereof by installing the terminal cover 330. Thus, an inside surface of the terminal cover 330 serves as a counterpart to the jaws 632, providing an opposing force for holding the building wire 122.

Although a two-gang form factor is discussed in detail herein, in alternative embodiments, the module 120 may have an electrical box 300 with a single-gang form factor. Such embodiments and may omit ports 222A, 222B for low voltage wires while retaining other structures such as the outlet 210, surge protection electronics 420, medial compartment 320, and terminal compartment 602. Similarly, embodiments of the invention include modules 120 having an arbitrary number of gangs containing a corresponding number of outlets 210. According to such embodiments each outlet may be protected by its own surge protection circuitry, or they may all share a common surge protection circuit. The person having ordinary skill in the art could readily use the teachings herein to make and use such alternative embodiments without undue experimentation. Such embodiments may be particularly useful in connection with appliances that do not include audio or video cables, such as refrigerators and other typical kitchen appliances.

The module 120 is installable in a pre-existing wall, such as a 2×4 framed wall covered with sheetrock. The skilled artisan will readily understand how such an installation may be performed; however, the following is provided as a non-limiting example. A template, such as a paper template may be positioned on the wall between two studs in a location where a flat screen television is to be wall-mounted. Cut lines may be thus marked on the wall. A tool such as a drywall jab saw may be used to cut out a section of the drywall sized to receive the module 120. A second hole is similarly made below the first hole and is sized to receive the second module. The second hole will typically be at the same height as that of a pre-existing nearby outlet hardwired to mains power. The free end of the building wire, fully installed in the first module 120, is fed into the first hole in the drywall to the second hole. Similarly, any low voltage cables 124 can be threaded through the low voltage wire ports 222A, 222B of the first module 120 and fed along with the building wire 122 to the second hole. The first module 120 is then inserted into to the hole in the drywall with its flange 200 flush against the wallboard and is then fastened thereto by tightening the screws 230 and mounting fins 314. The mounting fins 314 deploy as the screws 230 are turned clockwise until they come to rest against the guiderails 312.

As the screws 230 are further tightened, the wallboard is compressed between the flange 200 and the mounting fins 314.

Figure 7A:
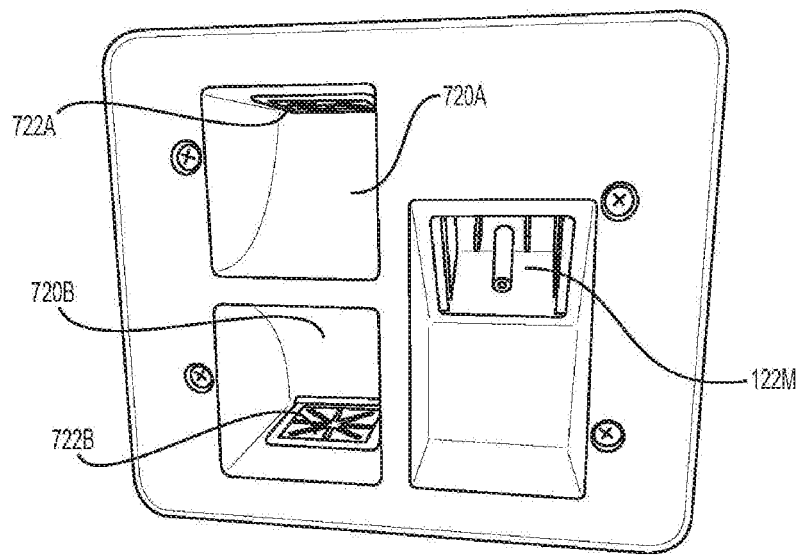
FIG. 7A is a front view of the second module.
Figure 7B:
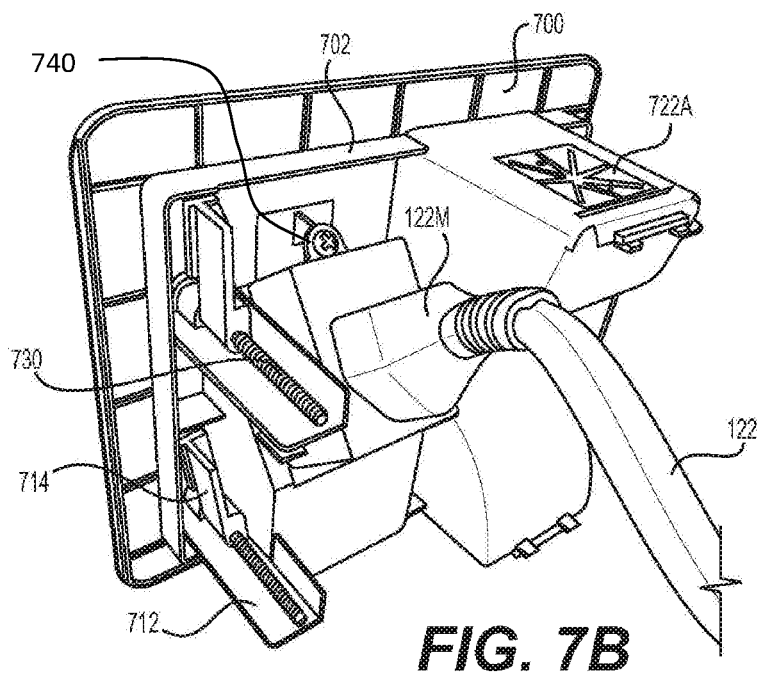
FIG. 7B is a rear view of the second module.

The building wire 122 and low voltage cables 124 are pulled through the second hole. The end of the building wire 122 terminates in a male plug 122M which is now screw mounted to the second module 130 with screw 740 (see FIG. 7B). The low voltage cables 124 can be threaded through the low voltage wire ports 722A, 722B of the second module 130. Similar to the first module 120, the second module 130 includes wire scoops 720A, 720B to aid in routing low voltage wires 124 (see FIG. 7A). The second module 130 is now fitted into the cut-out hole so that its flange 700 and register boss 702 abut the wall board. The screws 730 are turned clockwise thereby deploying the mounting fins 714 which rotate until the abut the guiderails 712. Continuing to turn the screws 730 clockwise compresses the wallboard between the flange 700 and mounting fins 714.

Until power is supplied to the male plug 122M, the system is not energized. The system can be energized by running an extension cord 132 from a nearby outlet 140 to the male plug 122M, as shown in FIG. 1.

It will be apparent to those skilled in the art that the above methods and apparatuses may be changed or modified without departing from the general scope of the invention. The invention is intended to include all such modifications and alterations insofar as they come within the scope of the appended claims or the equivalents thereof.

I claim:

1. A power bridge module, comprising:
   an electrical box having a first gang and a second gang;
   an electrical outlet disposed in the first gang;
   at least one low voltage wire port disposed in the second gang, and communicable with an interior of a hollow wall;
   a medial compartment bounded by a medial wall and a medial enclosure, wherein the medial compartment is divided from the first and/or second gang by the medial wall;
   a plurality of outlet terminals of the electrical outlet being communicably accessible from within the medial compartment;
   a surge protection circuit housed within the medial compartment, and in electrical communication with the plurality of outlet terminals; and
   a plurality of medial terminals extending through the medial enclosure and communicably accessible from a side of the medial enclosure opposing the medial compartment, wherein the plurality of medial terminals are in electrical communication with the plurality of outlet terminals through the surge protection circuit.

2. The power bridge module of claim 1, further comprising a terminal cover cooperating with the medial enclosure to enclose a terminal compartment housing the plurality of medial terminals.

3. The power bridge module of claim 2, further comprising a cable clamp having a jaw disposed on the medial enclosure of the terminal compartment, the jaw being co-operable with a surface of the terminal cover to fixedly hold a building wire in compression between the jaw and the terminal cover.

4. The power bridge module of claim 1, wherein the medial enclosure is attachable to the electrical box.

5. T The power bridge module of claim 2, wherein the terminal cover is attachable to the medial enclosure.

6. The power bridge module of claim 1, wherein the plurality of medial terminals are co-operable with 14 gauge building wire.

7. The power bridge module of claim 1, wherein the electrical box further comprises a flush mounting flange.

8. The power bridge module of claim 1, wherein the surge protection circuit is integrated on a circuit board mounted separate from the outlet.

9. The power bridge module of claim 8, wherein the circuit board is mounted to the medial wall in the medial compartment.

10. The power bridge module of claim 9, wherein the circuit board is mounted behind the first gang and/or the second gang.

11. The power bridge module of claim 1, wherein the surge protection circuit comprises one or more metal oxide varistors housed within a fireproof ceramic housing.

12. T The power bridge module of claim 11, wherein the surge protection circuit further comprises a thermal circuit breaker in thermal communication with the one or more metal oxide varistors and configured to open the surge protection circuit when the one or more metal oxide varistors reach a predetermined unsafe temperature.

13. A power bridge module, comprising:
   an electrical box;
   at least one electrical outlet disposed in the electrical box;
   a medial compartment bounded by a medial wall and a medial enclosure, wherein the electrical outlet is disposed in and extends through the medial wall, and, wherein the medial enclosure is removably attachable to the electrical box;
   a plurality of outlet terminals of the electrical outlet being communicably accessible from within the medial compartment;
   at least one surge protection circuit housed within the medial compartment, and in electrical communication with the plurality of outlet terminals, wherein the at least one surge protection circuit is integrated on a circuit board mounted separate from the outlet; and
   a plurality of medial terminals extending through the medial enclosure and communicably accessible from a side of the medial enclosure opposing the medial compartment, wherein the plurality of medial terminals are in electrical communication with the plurality of outlet terminals through the at least one surge protection circuit.

14. The power bridge module of claim 13, wherein the at least one surge protection circuit comprises one or more metal oxide varistors housed within a fireproof ceramic housing.

15. The power bridge module of claim 13, comprising a plurality of electrical outlets.

16. The power bridge module of claim 15, wherein each of the plurality of electrical outlets is protected by its own surge protection circuit.

17. The power bridge module of claim 15, wherein each of the plurality of electrical outlets is protected by a common surge protection circuit.

* * * * *